US012791511B2

(12) United States Patent
Mazzei et al.

(10) Patent No.: US 12,791,511 B2
(45) Date of Patent: Nov. 10, 2026

(54) ELECTRODE FOR DETECTING ANALYTES, RELATIVE BIOSENSOR AND PRODUCTION METHOD

(71) Applicant: Biosensing S.r.l., Rome (IT)

(72) Inventors: Franco Mazzei, Rome (IT); Francesca Polli, Rome (IT); Salvatore Minisola, Rome (IT)

(73) Assignee: BIOSENSING S.R.L., Rome (IT)

(*) Notice: Subject to any disclaimer, the term of this patent is extended or adjusted under 35 U.S.C. 154(b) by 203 days.

(21) Appl. No.: 18/717,147

(22) PCT Filed: Dec. 5, 2022

(86) PCT No.: PCT/IB2022/061784

§ 371 (c)(1),
(2) Date: Jun. 6, 2024

(87) PCT Pub. No.: WO2023/105389

PCT Pub. Date: Jun. 15, 2023

(65) Prior Publication Data

US 2025/0044251 A1 Feb. 6, 2025

(30) Foreign Application Priority Data

Dec. 7, 2021 (IT) ........................ 102021000030893

(51) Int. Cl.
*G01N 27/327* (2006.01)

(52) U.S. Cl.
CPC ................................ *G01N 27/3278* (2013.01)

(58) Field of Classification Search
CPC ... G01N 27/3278; G01N 27/327-3272; G01N 33/54326
See application file for complete search history.

(56) References Cited

U.S. PATENT DOCUMENTS 9,581,590 B2 2/2017 Alocilja

OTHER PUBLICATIONS

Zhang et al. Chin J Anal Chem, 2013, 41(9), 1353-1358 (Year: 2013).*
Loyprasert et al., "Label-free capacitive immunosensor for microcystin-LR using self-assembled thiourea monolayer incorporated with Ag nanoparticles on gold electrode," Biosensors and Bioelectronics 24 (2008) 78-86 (Year: 2008).*
International Search Report and Written Opinion of the ISA for PCT/IB2022/061784, mailed Mar. 16, 2023, 12 pages.

(Continued)

*Primary Examiner* — Alexander S Noguerola
(74) *Attorney, Agent, or Firm* — Nixon & Vanderhye P.C.; Lars H. Genieser

(57) ABSTRACT

An electrode for electrochemical detection of an analyte in a biological sample, wherein the electrode is a printed, miniaturized, carbon-based electrode and comprises (i) magnetic nanoparticles coated with gold or silver, comprising on the respective surface at least one free amine group or at least one free carboxyl group, the nanoparticles being adsorbed on the surface of the electrode, and (ii) at least one ligand capable of specifically binding to the analyte, the at least one ligand being conjugated to the nanoparticles.

16 Claims, 5 Drawing Sheets

(56) References Cited

OTHER PUBLICATIONS

Thao Thi-Hien Pham et al: 1-15 "Electrochemical analysis of gold-coated magnetic nanoparticles for detecting immunological interaction", Journal of Nanoparticle Research ; An Interdisciplinary Forum for Nanoscale Science and Technology, vol. 12, No. 1, Feb. 24, 2009, pp. 227-235, XP019773272.
Saimon Moraes Silva et al: "Gold coated magnetic nanoparticles: from preparation to surface modification for analytical and biomedical applications", Chemical Communications, vol. 52, No. 48, Jan. 1, 2016, pp. 7528-7540, XP055528384.
Rachna Rawal et al: "An electrochemical sulfite biosensor based on gold coated magnetic nanoparticles modified gold electrode" , Biosensors and Bioelectronics, Elsevier Science Ltd, vol. 31, No. 1, Oct. 6, 2011, pp. 144-150, XP028353741.
Xin Yang et al: "A novel H2O2biosensor based on Fe3O4—Au magnetic nanoparticles coated horseradish peroxidase and graphena sheets—Nafion film modified screen-printed carbon e", Electrochimica Acta, Elsevier, vol. 109, Aug. 8, 2013, pp. 750-755, XP028754509.

* cited by examiner

ELECTRODE FOR DETECTING ANALYTES, RELATIVE BIOSENSOR AND PRODUCTION METHOD

This application is the U.S. national phase of International Application No. PCT/IB2022/061784 filed Dec. 5, 2022, which designated the U.S. and claims priority to IT patent application No. 102021000030893 filed Dec. 7, 2021, the entire contents of each of which are hereby incorporated by reference.

FIELD OF THE INVENTION

The present invention relates to an electrode for the electrochemical detection of analytes in a biological sample, a biosensor comprising this electrode and a method for producing the electrode.

TECHNOLOGICAL BACKGROUND

The growing demand for fast and reliable methods to be used at the point of care, to reduce the pressure on analytical laboratories and the costs that national healthcare systems have to bear, has given a strong impetus to the development of new analytical devices, including biosensors.

A biosensor is defined as an analytical device containing a biological agent capable of specifically binding the analyte of interest in intimate contact with a signal transducer. The biological agents used may be enzymes, antibodies, DNA fragments, bacteria, cells, tissues, etc.; these interact directly or indirectly with the analyte to be determined and are responsible for the specificity of the sensor. Depending on the type of reaction, the signal transducer may be of the electrochemical, optical, calorimetric or acoustic type. At present, the most widely used biosensors are those of the electrochemical type.

Electrochemical biosensors are based on the detection of variations in the electrochemical properties. The analyte that must be measured, which is not electroactive, reacts with the biological agent immobilized on the electrode, with the consequent production of an electroactive species which is discharged to the electrode with consequent detection of the current intensity (in the case of enzymatic biosensors), or causes a variation of a current signal due to the variation in mass on the electrode surface or to the discharge of a labelled species (in the case of affinity biosensors). The signal detected is related to the concentration of the analyte. Electrochemical biosensors can—in turn—be divided into three different categories: potentiometric, conductometric and amperometric. In the first case, the electrode develops a variable potential, related to the logarithm of the activity or concentration of the analyte being tested. In conductometric biosensors, the current due to the movement of ions in solution following the application of an alternating potential between two inert electrodes is measured. The amperometric pathway is the most commonly used transduction method for developing biosensors, thanks to its high specificity and wide range of linearity, and consists of measuring the electric current generated at the electrode following the interaction between the analyte and the biological agent.

The scientific literature concerning electrochemical biosensors is extremely broad, and ranges from articles describing different embodiments of biosensors to articles demonstrating the qualities of biosensors in determining a wide range of analytes.

Y Xu & E. Wang [1] provide a brief review on electrochemical biosensors employing magnetic micro/nano-particles for immobilizing the trapping agent. L. Liv [2] describes a biosensor for detecting anti-Covid antibodies in a serum sample; the working electrode consists of a glassy carbon electrode on whose surface the spike protein is fixed. M. J. Monerris et al. [3] describe a biosensor for detecting progesterone in a competitive assay; the working electrode consists of a gold electrode on the surface of which gold nanoparticles are fixed, in turn conjugated with anti-progesterone antibodies. The biosensors described in [2-3] exploit electrochemical techniques for detecting the analyte of interest. Gold-coated magnetic nanoparticles stabilized by means of conjugation with a capping agent have been used, respectively, as tracers for an electrochemical biosensor [4] or as electrochemical and optical sensors [5].

Disadvantages associated with this type of system often lie in the high cost of the electrodes used to increase the electrochemical signal—and therefore the sensitivity of the system—such as gold [2-3] or in the use of systems that give excellent results with traditional electrodes (such as the aforementioned glassy carbon) to the detriment of miniaturizability [2].

In recent years, several papers on the electrochemical detection of vitamin D have been published. In 2013, Carlucci et al. published a comparison in the analysis of vitamin D between an electrochemical immunosensor based on 4-ferrocenylmethyl-1,2,4-triazoline-3,5-dione as a redox marker (limit of detection of 10 ng/mL) and an immunosensor based on surface plasmon resonance (limit of detection of 1 μg/mL). The results showed that the electrochemical sensing technique shows better results than the surface plasmon resonance technique [6]. Subsequently, several papers have been published on the use of electrochemical methods for determining vitamin D. Canevari et al. produced a modified glassy carbon electrode employing nickel (II) hydroxide particles supported on silica-graphene hybrid material characterized by a limit of detection of 3.26 nM [7]. Ozbakir et al. published a work on a biosensor for analyzing vitamin $D_3$ by immobilizing a human cytochrome P45027B1 on a glassy carbon electrode using [Co(sep)3+] as a redox mediator in cyclic and square wave voltammetry measurements [8]. In 2018, Chauhan et al. proposed the electrospun ITO electrode of hydrolyzed $Fe_3O_4$ fibers/polyacrylonitrile fibers as a sensing electrode in the development of an immunoelectrode for vitamin $D_3$ sensing. The resulting electrochemical immunosensor showed a limit of detection of 0.12 ng/mL [9]. In 2019, Chauhan et al. produced an electrochemical immunosensor for detecting vitamin $D_3$ based on aspartic acid-functionalized gadolinium oxide nanotubes, with a detection limit of 0.10 ng/mL [10]. In 2020, a work based on the use of gold-platinum nanoparticles (Au—Pt NPs) supported on a glass electrode modified with 3-(aminopropyl)triethoxysilane (APTES) fluoro-tin oxide (FTO) was proposed as a transducer of a immunosensor for detecting vitamin $D_3$ [11]. The immunosensor showed a limit of detection of 0.49 pg/mL.

However, the aforesaid biosensors have several disadvantages in terms of: sensitivity not sufficient to detect states of normo- and hypo-vitaminosis [6], impossibility of miniaturization [7, 8], or poor linearity of the signal especially in the lower portion of the curve [9, 10].

Despite the great development of electrochemical biosensors, the need is still felt to make available electrochemical biosensors that are low-cost and easily producible, while ensuring the activity and stability of the capture reagent on the electrode surface and transforming the biological recognition reaction between the capture reagent and the analyte.

SUMMARY OF THE INVENTION

The present invention proposes to provide an electrode for the electrochemical detection of an analyte in a biological sample which satisfies the above requirements.

In accordance with the invention, the abovesaid object is achieved thanks to the solution specifically recalled in the attached claims, which form an integral part of the present description.

One embodiment of the present invention concerns an electrode for electrochemical detection of an analyte in a biological sample, wherein the electrode is a printed, miniaturized, carbon-based electrode and comprises (i) magnetic nanoparticles coated with gold or silver, comprising on the respective surface at least one free amine or carboxyl group, the nanoparticles being adsorbed on the surface of the electrode, and (ii) at least one ligand capable of specifically binding to the analyte, the at least one ligand being conjugated to the nanoparticles.

Other embodiments of the present invention relate to a biosensor comprising the aforesaid electrode, a method for producing this electrode and a diagnostic method which uses this electrode.

The electrode developed within the scope of the present invention and the products deriving from its application are of considerable interest in the diagnostic sector, meeting the request for a more widespread diffusion of miniaturized, portable and inexpensive devices for real-time screening of an analyte. The electrode described here improves patient compliance, or rather, sample collection may be performed using a lancet for lancing device, reducing both logistical and economic pressure on the hospital/diagnostic center and on the National Health Service (NHS).

BRIEF DESCRIPTION OF THE DRAWINGS

The invention will now be described, by way of example, with reference to the attached drawings, wherein.

DETAILED DESCRIPTION OF THE INVENTION

Figure 1:
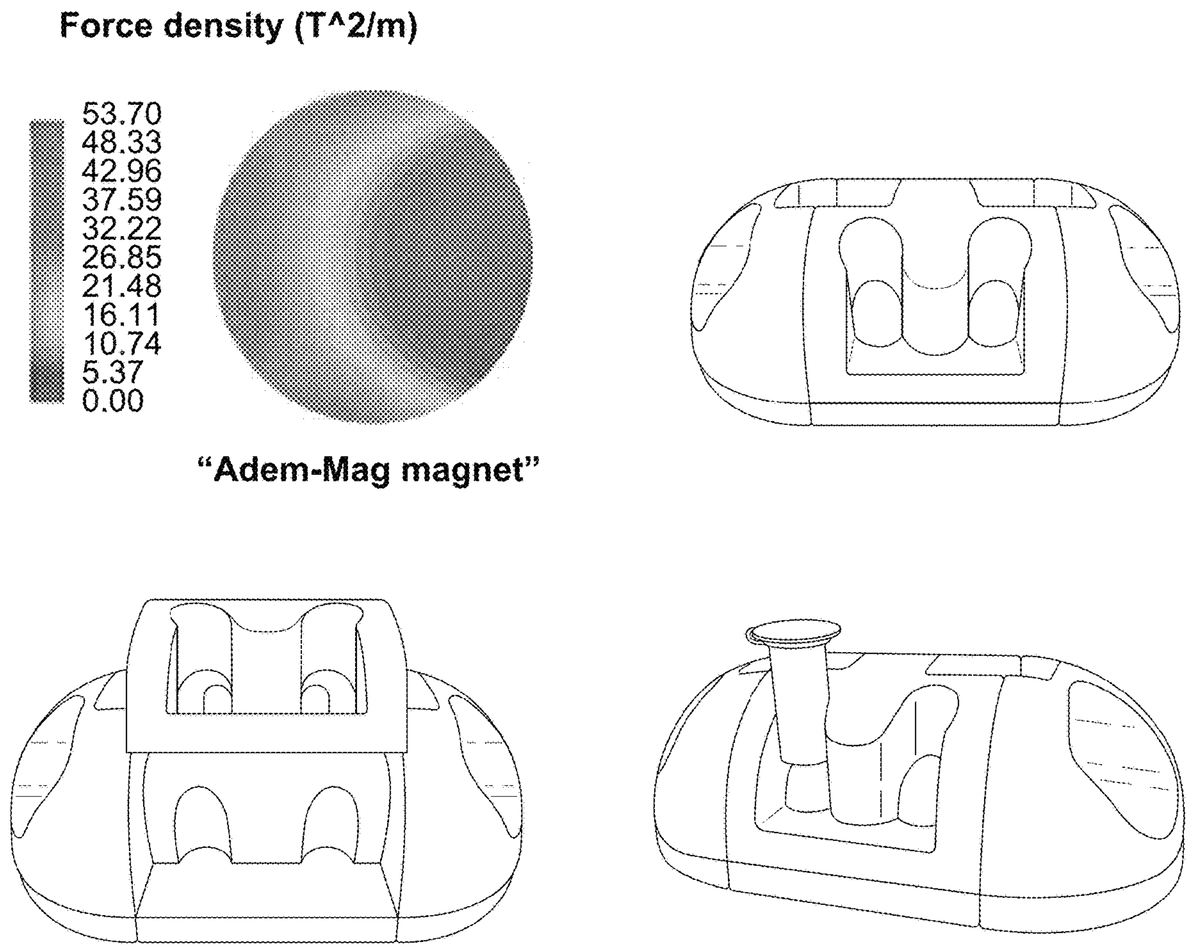
FIG. 1: Force density of Adem-Mag magnet reported in the technical documentation of the product. On the right, the photo of the Ademtech magnetic rack for washing the used Au@MNPs.

In the following description, there are numerous specific details to provide a thorough understanding of the embodiments. The embodiments may be implemented in practice without one or more of the specific details, or with other methods, components, materials, etc. In other cases, well-known structures, materials or operations are not shown or described in detail to avoid obscuring certain aspects of the embodiments.

Throughout the present specification, the reference to "an embodiment" or "embodiment" means that a particular configuration, structure, or characteristic described in connection with the embodiment is included in at least one embodiment. Therefore, the appearance of expressions "in a certain embodiment" or "in an embodiment" in various point throughout this specification does not necessarily always refer to the same embodiment. Moreover, the particular details, structures or characteristics can be combined in any suitable way in one or more embodiments.

The headings used here are used merely for convenience and do not interpret the object or meaning of the embodiments.

One embodiment of the present invention relates to an electrode for the electrochemical detection of an analyte in a biological sample, wherein the electrode is a carbon-based, miniaturized, printed electrode and comprises (i) gold- or silver-coated magnetic nanoparticles, comprising on the respective surface at least one free amino or carboxyl group, the nanoparticles being adsorbed on the electrode surface, and (ii) at least one ligand capable of specifically binding to the analyte, the at least one ligand being conjugated to the nanoparticles. The at least one ligand is covalently conjugated to the nanoparticles by means of the at least one amino group or the at least one carboxyl group present on the surface of the nanoparticles.

The fact that the nanoparticles are coated with gold allows increasing the detected current signal, improving the biotransducer-electrode communication with a consequent increase in the sensitivity of the system.

The fact that the nanoparticles are adsorbed on the electrode surface also offers advantages in determining the analyte. In fact, in this way, it is not necessary to use the magnet during the measurement.

In one embodiment, the miniaturized, printed electrode is a silk-screen electrode.

In one embodiment, the carbon-based, miniature, printed electrode is a miniature, printed electrode of graphite, graphene, carbon nanotubes, or carbon fibers, preferably graphite.

In a preferred embodiment, the electrode is a graphite screen-printed electrode.

Screen-printed electrodes, in contrast to the glassy graphite electrodes presented in the references [1-11], are miniaturizable and low cost. The use of graphite instead of gold [2-3] manages to lower the cost of the electrode while maintaining unchanged, or even improving, the performance of the measurement system.

In one embodiment, the nanoparticles (preferably having a diameter between 50 and 300 nm) comprise on the respective surface at least one compound of formula (I) (also called capping agent).

$$SH—R_4—R_5 \quad (I)$$

wherein $R_4$ is selected from linear, saturated $C_{2-11}$ alkyl chains and $R_5$ is selected from $NH_2$ and COOH. Preferably, $R_4$ is selected from saturated, linear $C_{2-7}$ alkyl chains; more preferably $R_4$ is selected from linear, saturated, $C_{2-5}$ alkyl chains. The at least one compound of formula (I) is adsorbed on the surface of the nanoparticles by means of the thiol group, which has a high affinity for noble metals.

In one embodiment, the compound of formula (I) is selected from cysteamine, 3-mercaptopropionic acid and 11-mercaptoundecanoic acid.

In one embodiment, the at least one ligand is covalently conjugated to the nanoparticles by means of a cross-linking agent. More specifically, the covalent bond is formed, in the presence of the cross-linking agent, between the ligand and the compound of formula (I) adsorbed on the surface of the nanoparticles.

In one embodiment, the cross-linking agent is selected from a compound comprising at least two terminal aldehyde groups and a carbodiimide derivative.

In one embodiment, the cross-linking agent comprising at least two terminal aldehyde groups is a compound of (II)

$$CHO—(CH_2)_n—CHO \quad (II)$$

wherein n is an integer comprised between 1 and 2. Preferably, the crosslinking compound of formula (II) is glutaraldehyde.

In one embodiment, the carbodiimide derivative has formula (III)

(III)

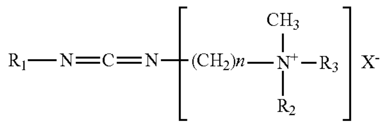

wherein $R_1$ is selected from propyl, tert-butyl, and cyclohexyl, $R_2$ and $R_3$ are independently selected from hydrogen and a $C_{1-3}$ alkyl group (preferably methyl or ethyl), or $R_2$ and $R_3$ form together with the nitrogen atom to which they are linked a 4-6 membered heterocyclic group, optionally comprising an additional heteroatom (preferably 0), X is selected from bromide, iodide and 4-methyl-toluenesulfonate, and n is an integer between 2 and 3. Preferably the carbodiimide is selected from 1-ethyl-3-(3-dimethylaminopropyl) carbodiimide (ECD) and 1-cyclohexyl-3(2-morpholinethyl)-carbodiimide (CMC).

When the cross-linking agent is a compound of formula (II), the covalent bond between the ligand and the compound of formula (I) adsorbed on the surface of the nanoparticle may be formed only if the $R_5$ residue of the compound of formula (I) is an amino group ($R_5$═$NH_2$). In this case the covalent bond is formed—in the presence of the compound of formula (II)—by reaction of an amino group of the compound of formula (I) with an amino group of the ligand with the formation of two secondary imino groups between the ligand and the compound of formula (I). Schematically the reaction is shown below:

$$AuS—R_4—NH_2+CHO\text{-}A\text{-}CHO+NH_2\text{-}LIG \rightarrow AuS—R_4—N═C\text{-}A\text{-}C═N\text{-}LIG$$

where Au stands for the gold present on the surface of the nanoparticles and LIG for the ligand.

When the cross-linking agent is a carbodiimide derivative of formula (III), the covalent bond between the ligand and the compound of formula (I) adsorbed on the nanoparticle surface is formed:

a) when the $R_5$ residue of the compound of formula (I) is an amino group ($R_5$═$NH_2$), by reaction—in the presence of the cross-linking agent, more preferably in the presence of the cross-linking agent and N-hydroxysuccinimide (NHS)—of the amino group of the compound of formula (I) with a free carboxyl group of the ligand with formation of a secondary amide group between the ligand and the compound of formula (I); or b) when the $R_5$ residue of the compound of formula (I) is a carboxyl group ($R_5$═COOH), by reaction—in the presence of the cross-linking agent, more preferably in the presence of the cross-linking agent and N-hydroxysuccinimide (NHS)—of the carboxyl group of the compound of formula (I) with a free amino group of the ligand with formation of a secondary amide group between the ligand and the compound of formula (I).

The reaction referred to in point a) is schematically illustrated below:

$$LIG\text{-}COOH+R_1—N═C═N—B+NHS \rightarrow LIG\text{-}COO—N(CH_2—CH_2)_2$$

$$AuS—R_4—COO—N(CH_2—CH_2)_2+NH_2\text{-}LIG \rightarrow AuS—R_4—C═O—NH_2\text{-}LIG$$

The reaction referred to in point b) is schematically illustrated below:

$$AuS—R_4—COOH+R_1—N═C═N—B+NHS \rightarrow AuS—R_4—COO—N(CH_2—CH_2)_2$$

$$AuS—R_4—COO—N(CH_2—CH_2)_2+NH_2\text{-}LIG \rightarrow AuS—R_4—C═O—NH_2\text{-}LIG$$

The choice of forming a covalent bond between the nanoparticles and the ligand allows creating an electrode that has the ligand on its surface, which is stable over time. In fact, compared to immobilization through physical adsorption, covalent immobilization ensures a stable bond of the biomolecule on the surface due to the establishment of a real chemical bond with the surface.

Also the length of the alkyl chain of the compound of formula (I) was selected in such a way as to obtain the highest possible current passage on the electrode so as to transform the biological recognition reaction between the ligand and the analyte into a very sensitive electric signal. The choice fell on short-chain alkyl chains, which do not hinder the passage of current on the surface.

In one embodiment, the electrode also comprises at least one neutralizing agent (also called blocking agent) on the respective surface. This agent avoids forming non-specific binding of protein compounds contained in the sample to be analyzed at the surface of the nanoparticles, thus reducing the background signal and improving the signal-to-noise ratio. The neutralizing agent is adsorbed, preferably passively, on the surface of the nanoparticles. In one embodiment, the neutralizing agent is selected from bovine serum albumin, casein, dextran and ethanolamine.

In a preferred embodiment, the analyte to be detected is vitamin (25-OH)D and the at least one ligand is an anti-(25-OH)D antibody.

In one embodiment, the biological sample is whole blood, plasma or serum.

A further embodiment of the invention subject of the present description concerns a biosensor for the electrochemical detection of an analyte in a biological sample, where the biosensor comprises an electrode as described above as the working electrode, a reference electrode and a counter-electrode.

The biosensor also comprises a device capable of measuring the passage of current between the working electrode and the counter-electrode, allowing the presence or concentration of the analyte in the sample to be determined. The passage of current is measured with the voltammetric technique.

A drop of sample containing the analyte is deposited on the working electrode and left to react so that the binding reaction between analyte and ligand takes place (preferably about 30 minutes), the electrode is subsequently rinsed. Once dry, the electrode is removed from the magnetic support and connected to a potentiostat—controlled by a computer—via a special cable (DRP-CAST). A redox probe solution is then injected onto the electrode and the DPV measurement is set using the computer. Once the measurement has been made, the peak current intensity from the probe discharge is recorded and traced back to the concentration of the analyte present in the sample.

A further embodiment of the invention subject of the present description concerns a method for producing an electrode as described above, wherein the method comprises the following steps:

(a) adding gold- or silver-coated magnetic nanoparticles to a first solution comprising at least one compound of formula (I), $$SH—R_4—R_5 \qquad (I)$$

wherein $R_4$ is selected from saturated, linear $C_{2-11}$ alkyl chains and $R_5$ is selected from $NH_2$ and COOH, so that the at least one compound of formula (I) is adsorbed on the surface of the nanoparticles by means of the thiol group, obtaining a second solution comprising nanoparticles comprising at least one free amino or carboxyl group on the respective surface;

(b) depositing the second solution on the surface of a printed, miniaturized, carbon-based electrode in the presence of a magnet positioned below the electrode and allowing the liquid phase of the second solution to evaporate so that the nanoparticles are adsorbed onto the surface of the electrode;

(c) adding a third solution comprising a cross-linking agent preferably a compound of formula (II) or (III), on the electrode surface obtained at the end of step (b);

(d) adding a fourth solution comprising at least one analyte-specific ligand to the surface of the electrode obtained at the end of step (c) and allowing it to react for sufficient time for the at least one ligand to form a covalent bond with the compound of formula (I), resulting in an electrode comprising the at least one ligand attached to the respective surface.

In one embodiment, the method comprises an additional step (e), wherein a fifth solution comprising a neutralizing agent is added onto the surface of the electrode obtained at the end of step (d), to prevent forming non-specific bonds of protein compounds contained in the biological sample to be analyzed at the surface of the nanoparticles.

Some optimizations have been carried out on the concentration of the compound of formula (I) (capping agent) used for the functionalization of the gold-coated magnetic nanoparticles and on the incubation time of the cross-linking agent. The use of thiol capping agents bearing short-chain basic groups (CYM) were able to maximize the current signal when compared with thiols bearing acidic groups (MUA and MPA). Furthermore, during the measurement step, the concordance of the results obtained in the presence and absence of the magnetic support was taken into consideration, guaranteeing the possibility of recording the signal without the support.

In one embodiment, the invention subject of the present invention relates to a method for the electrochemical determination of an analyte in a biological sample comprising the following steps:

(a) contacting the biological sample containing or suspected of containing the analyte with a biosensor comprising an electrode as described above as a working electrode, a reference electrode, and a counter-electrode, under conditions such that the analyte binds to an analyte-specific ligand present on the working electrode, and the binding of the analyte to the ligand results in a change in current flow between the working electrode and the counter-electrode; and (b) detecting the change in current generated in step (a) by determining the presence or amount of the analyte in the sample.

In one embodiment, the change of current is determined in step b) with a voltammetric technique.

A preferred embodiment of the invention subject of the present application will be illustrated below with reference to the production of an electrode for the electrochemical detection of vitamin (25-OH)D. This description must not be understood in limitative terms of the sought-after protection scope, since the electrode can be used for determining any analyte of clinical interest contained in a biological sample.

Hypovitaminosis D is a pathological condition of significant clinical interest due to the epidemiological relevance of this deficiency state in the Italian adult population, with a prevalence that progressively increases with age. The maximum expression of vitamin D deficiency is observed in the geriatric population, but also in young adults during the winter months. Preventing and treating vitamin D deficiency has a marked clinical relevance in reducing the incidence of osteometabolic pathologies such as osteomalacia-rickets and osteoporosis, but also in reducing their clinical severity. Furthermore, the biological benefits of vitamin D replenishment have also been extensively studied in extra-skeletal pathological conditions, such as neoplastic, autoimmune and cardiovascular diseases. The increased diagnostic attention to hypovitaminosis D and its prevention have led, in recent years, to an increase in requests for the dosage of (25-OH)D levels, even if, currently, the costs borne by the NHS do not allow an extensive detection campaign of this parameter.

The electrode subject of the present description is able to satisfy both the economic needs of the NHS and the needs of the patients, being able to also carry out the examination at home avoiding going to analysis laboratories.

EXAMPLES

Materials

Gold-coated magnetic nanoparticles (AuMNPs) 25 mg/ml were purchased from Micromod GmbH. Cysteamine hydrochloride (CYM), glutaraldehyde 25% solution, monobasic sodium phosphate ($NaH_2PO_4$), dibasic sodium phosphate ($Na_2HPO_4$), potassium chloride (KCl), potassium ferricyanide trihydrate ($K_3Fe[CN]_6$-$3H_2O$), potassium ferrocyanide hexahydrate ($K_4Fe[CN]_6$-$6H_2O$) and 2-(N-morpholino)ethanesulfonic acid (MES) were obtained from Sigma Aldrich (St. Louis, MO, USA). Vitamin $D_3$, also 25-hydroxy vitamin D ((25-OH)D), was purchased from Gentaur GmbH. Recombinant monoclonal antibody (rabbit) anti-Vitamin D3 (anti-(25-OH)D Ab) was purchased from Thermo Fisher Scientific Inc. (Massachusetts, USA) and was stored as reported by the supplier at −20° C. The LIAISON® (25-OH)D TOTAL for Chemiluminescent Immunoassay (CLIA) kit for quantitative determination of 25-hydroxyvitamin D in human serum was obtained from DiaSorin® (Vicenza, Italy). Serum samples were tested with the reference method in the Laboratory of Prof. Salvatore Minisola (Rome, Italy) and were collected from volunteer donors receiving vitamin $D_3$ treatment. Samples were stored at −80° C. and analyzed without further dilution. All solutions were prepared using Milli-Q water (18.2 MΩ cm, Millipore, Bedford, MA, USA).

Equipment and Tools

The Magnetic Separation Magnetic Rack was purchased from Ademtech (France). The Adem-Mag magnet exploits the high energy of the neodymium-iron-boron [Nd—Fe—B] configuration to allow magnetic separation and the magnetic force is reported in FIG. 1.

The rotary stirrer (25°/s) was developed by the Mechanical Engineering Department of the Sapienza University of Rome (Italy).

Figure 2:
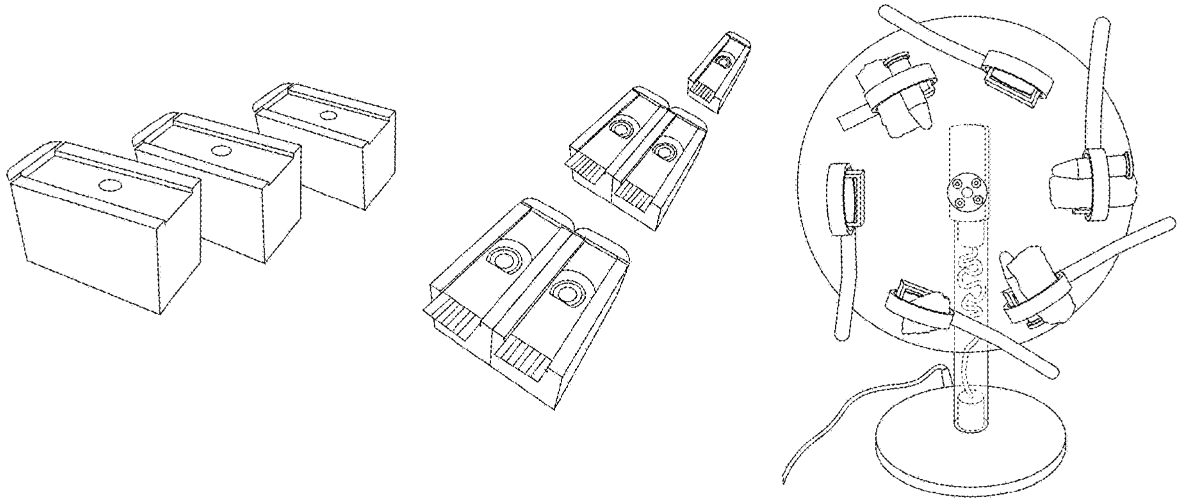
FIG. 2: Magnetic housing (DRP-MAGNET) for electrodes used for the rinsing steps. On the right, the rotating magnetic stirrer used for the functionalization of nanoparticles with thiols.

The screen-printed graphite electrodes (DRP-110) and the magnetic support for drop casting and measuring (DRP-MAGNET) were obtained from Metrohm (Switzerland). The magnetic support (FIG. 2), in particular, was used to stabilize the deposition of cysteamine-functionalized AuMNPs (CYM@AuMNPs) avoiding the "coffee-ring" effect, and concentrating the AuMNPs on the electrode.

Figure 3:
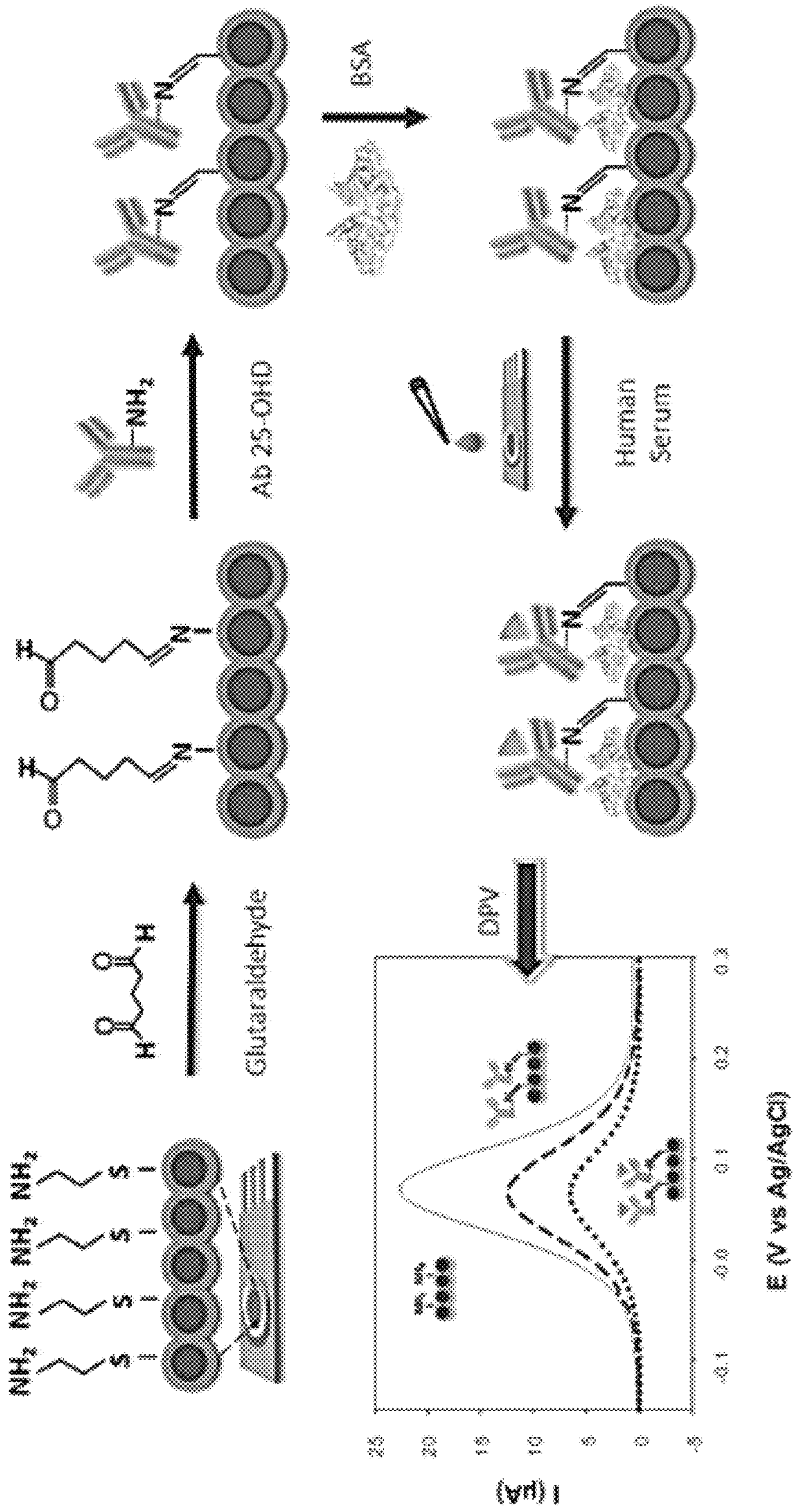
FIG. 3: Scheme of the production steps of a preferred embodiment of the electrode subject of the present description.

A general scheme for producing a preferred embodiment of the electrode according to the present invention is provided in FIG. 3.

Determining the passage of current to the electrode in the various production steps was carried out using an iron/ferricyanide redox probe. In fact, use of this probe makes it possible to monitor the surface changes that take place in producing the electrode. In fact, in the absence of surface impediments, the redox probe diffuses freely on the electrode surface and discharges, obtaining a certain current intensity. As the immobilization steps of the ligand, of the neutralizing agent and then of the analyte to be determined are carried out, there is a greater difficulty for the redox probe to reach the electrode surface (steric hindrance) with reduction of the current signal detected, which is proportional to the change in mass on the electrode surface.

Functionalization of AuMNPs

Before use, 10 μL of AuMNPs nanoparticles were taken from the batch at 25 mg/mL and diluted in 490 μL of distilled water. The 0.5 mg/mL solution was separated by incubating it in a magnetic rack for 2 minutes after which the supernatant was removed. The procedure was repeated twice, each of which was accompanied by a color change of the solution from dark to light brown.

After the washing steps, the sediment obtained was incubated in 500 μL of a solution of a compound containing a thiol group (capping agent) for 2 hours in a rotary shaker and deposited on the electrode the following day. During the entire functionalization process, the solution was kept in the dark to prevent oxidation of the thiols by UV light.

In order to choose the most advantageous thiol compound for the electrochemical measurements at the same time able to stabilize the dispersion of the AuMNPs and maximize the discharge of the electrochemical probe on the electrode, the performances were evaluated of three different functionalizations of Au@MNPs with 1 mM mercaptoundecanoic acid (MUA), 2 mM mercaptopropionic acid (MPA), and 18 mM cysteamine (CYM).

15 mL of functionalized particles were deposited on screen-printed graphite electrodes in their magnetic housings, allowed to dry, and then rinsed with distilled water. Once dry, the electrodes could be removed from the magnetic housings and tested in a 2 mM $FeCN_6^{3-/4-}$ 100 mM KCl solution to measure the DPV signal from the probe discharge.

Figure 4:
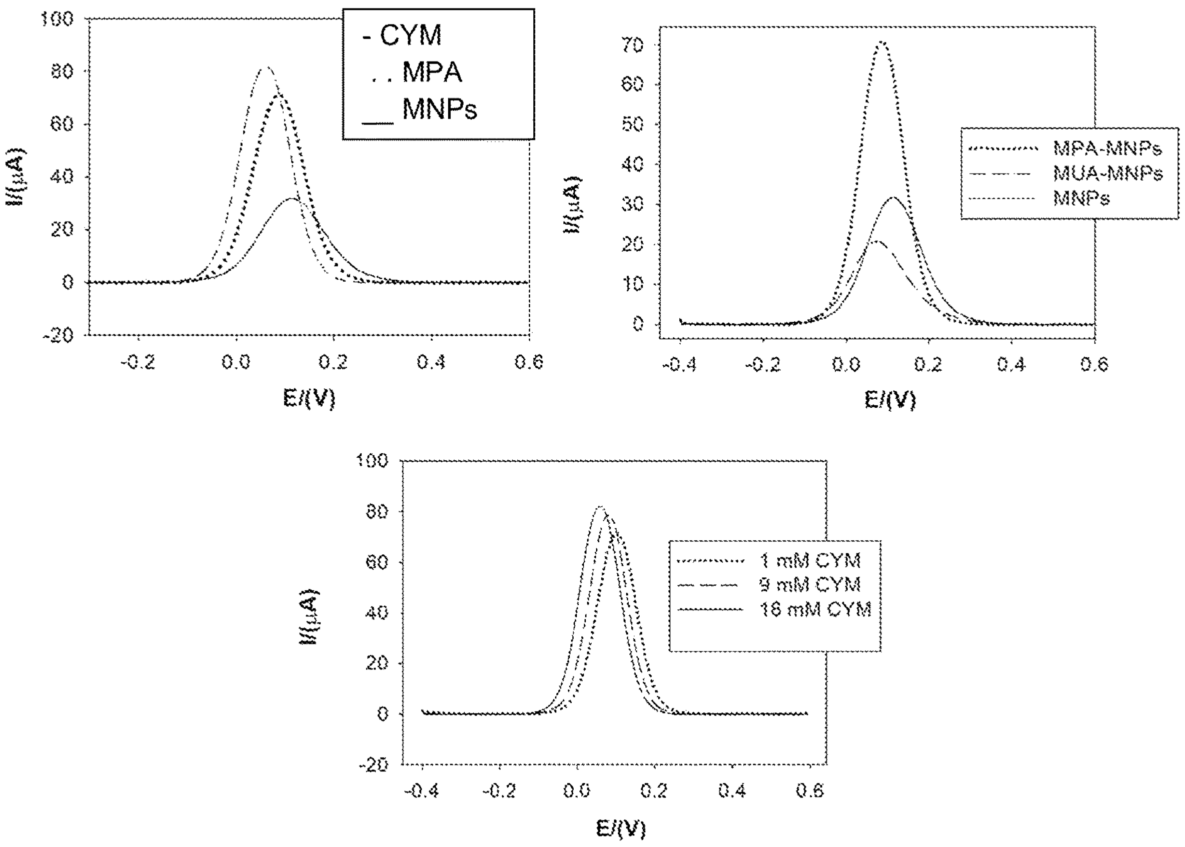
FIG. 4: DPV signals obtained following the deposition of Au@MNPs functionalized with MPA, CYM and MUA.

As shown in FIG. 4, the functionalization with CYM showed the greatest current flow on the electrode, followed by that obtained with MPA. This phenomenon has been traced to the repulsion that occurs between the negative probe and the carboxyl groups of 3-MPA exposed on the surface of the modified electrode. A further decrease of current was recorded in the case of functionalization with 11-MUA, and could be addressed to a slowdown of the diffusion capacity of the iron/ferricyanide probe through the hydrophobic undecanoic chain.

In order to increase the stabilization of the solution of AuMNPs, different concentrations of cysteamine (1-30 mM) were tested for the functionalization step. The highest current signal was obtained with the 18 mM CYM solution. The prepared CYM@AuMNPs solution was estimated to be able to completely cover the electrode surface and it was therefore possible to let drops of this solution fall onto the electrode as such.

Electrode Preparation

The graphite screen-printed electrodes (SPE) were rinsed gently with distilled water and 15 μL of a solution of CYM@AuMNPs was dropped onto the working electrode. The solution was allowed to dry at room temperature under a fume hood and to avoid any loss of nanomaterial, the SPE electrode was placed on a magnetic stand before the washing step. After the surface dried, the amino groups of the CYM were activated by treating the surface with 15 μL of 10% glutaraldehyde for 10 minutes. A solution of 30 μg/mL of anti-(25-OH)D antibody in PBS was dropped onto the electrode and allowed to react for 30 minutes. After the incubation time, the surface was washed with PBS and then treated for 20 minutes with 10 μg/mL of bovine serum albumin (BSA).

Electrochemical Characterization of the Electrode

Figure 5:
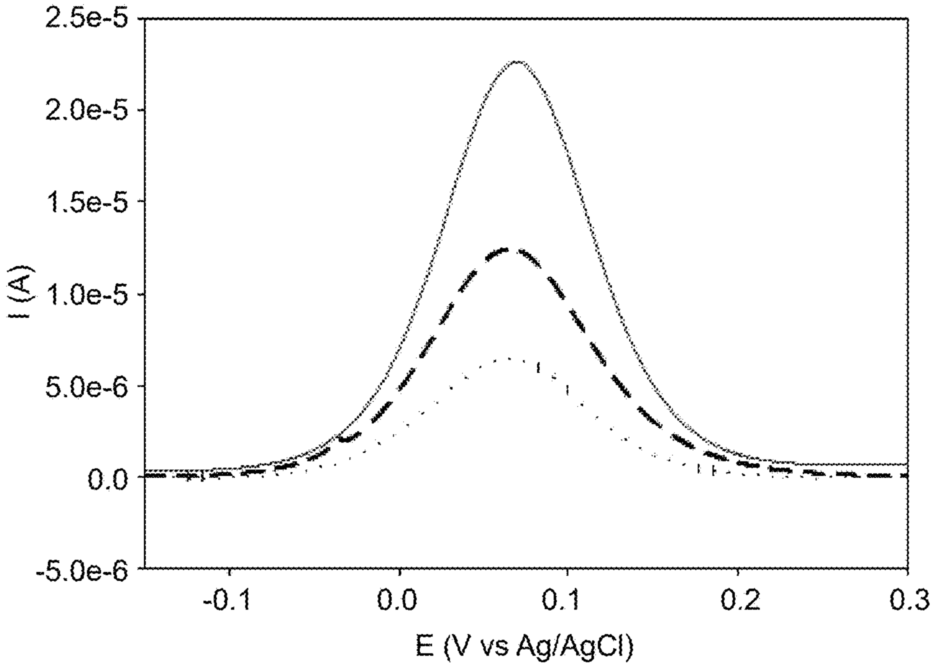
FIG. 5: Current decrease highlighted in DPV following the immobilization of an anti-(25-OH)D antibody (dashed line) and its interaction with 25-OHD (dots) on electrodes modified with CYM@AuMNPs (solid line).

Differential pulse voltammetry (DPV) measurements were performed to characterize and optimize nanoparticle deposition, antibody uptake and incubation conditions with (25-OH)D (FIG. 5). The figure shows the comparison between the current intensity related to the modification of Au@MNPs with cysteamine (solid line) and the respective current decreases at the immobilization of anti-(25-OH)D antibody (dashed line) and the subsequent signal in the presence of (25-OH)D antigen (dots). The lowering of current testifies to the increase in steric volume due to subsequent modifications. The largest decrease in current and, therefore, the largest amount of immobilized anti-(25-OH)D antibody was obtained with an incubation time of 30 minutes. Measurements were carried out in a 1.1 mM $Fe(CN)_6^{3-/4-}$, 100 mM KCl, between −0.4 to +0.6 V vs Ag|AgCl.

DPV Calibration

The electrode calibration was performed with the standard of the DiaSorin® kit in a range of 5-100 ng/mL of (25-OH) D, and recording the current signal with a potentiostat. For this purpose, the incubation was carried out by treating the surface with 15 μL of standard solution for 30 minutes at room temperature, keeping the electrode on the magnetic support and subsequently rinsing the surface with 10 mM PBS buffer, pH 7.4.

Real Samples and Correlation with CLIA-Immunoassay

Figure 6:
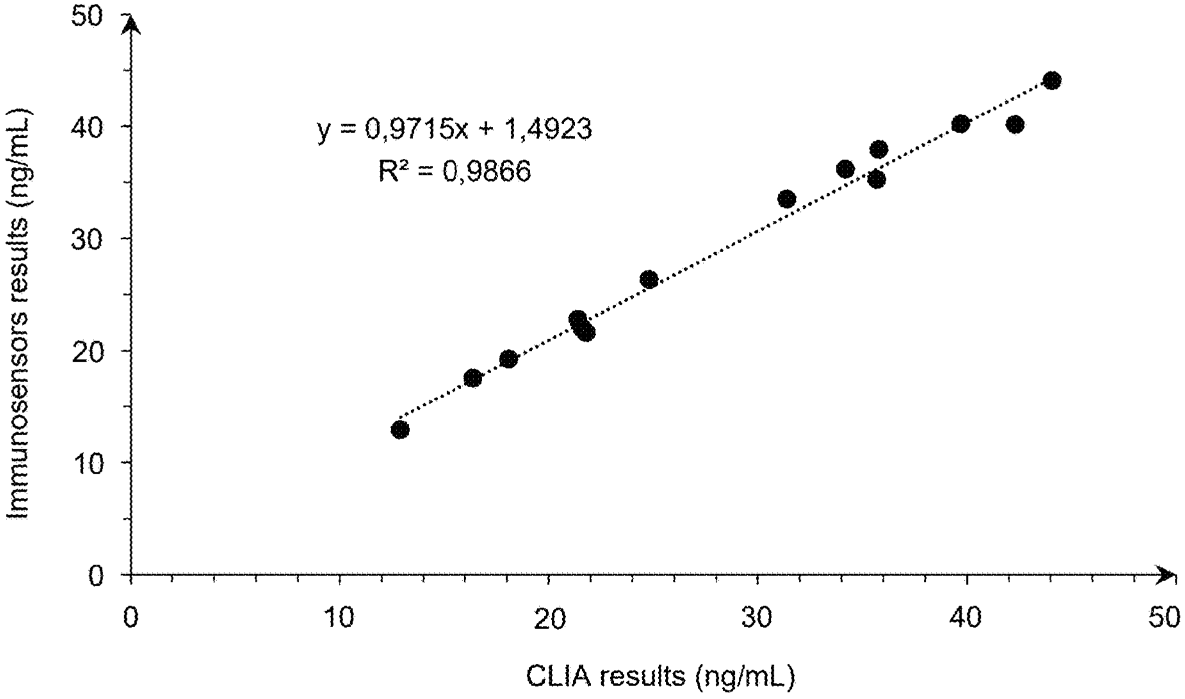
FIG. 6: (A) Correlation between the concentration of (25-OH)D for the tested real samples (1-13) and the electrochemical method CYM@MNPs (solid line) and the CLIA reference method (dashed line). (B) Differential pulsed voltammograms of SPE modified Au@MNPs obtained after 30 min incubation with (a) 47.50 ng/mL, (b) 42.30 ng/mL, (c) 39.70 ng/mL, (d) 31.40 ng/mL, (e) 24.80 ng/mL, (f) 21.80 ng/mL of human samples containing (25-OH)D.
Figure 7:
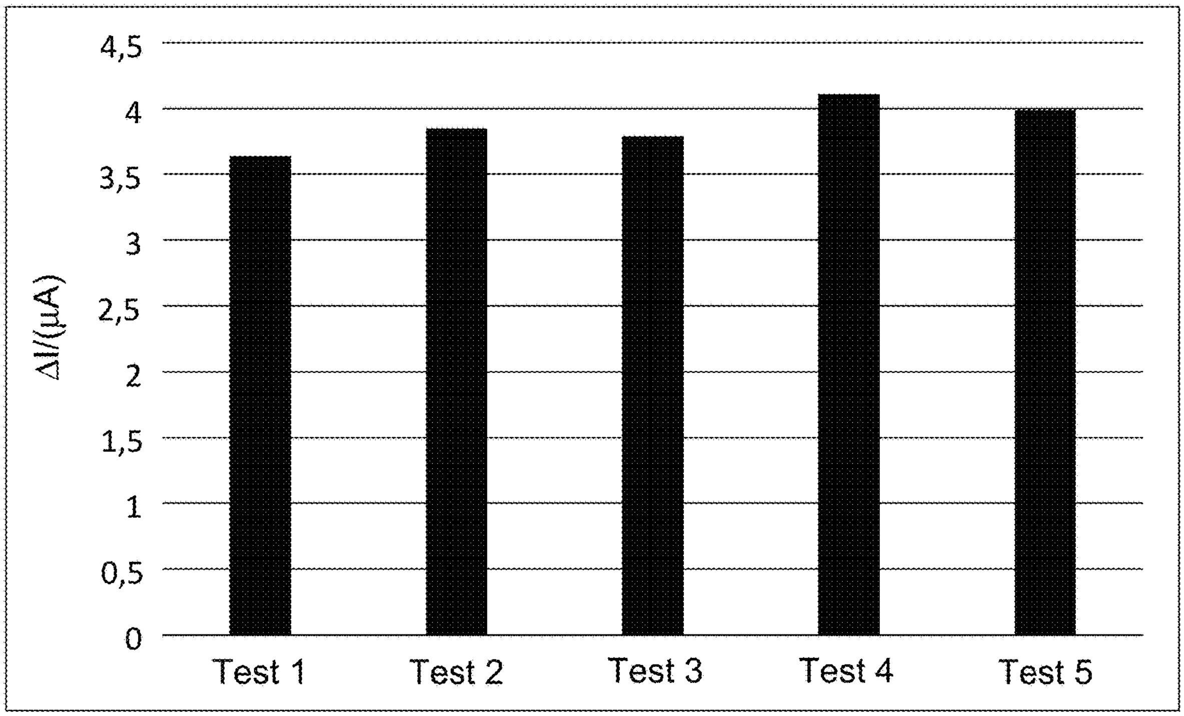
FIG. 7: Reproducibility in the detection measurements of (25-OH)D with an electrode according to the present invention made on serum samples (RSD=0.18%, average value of the detected current intensity=3.84 μA).

The electrode was calibrated using a standard vitamin $D_3$ solution. After this step, a biosensor (comprising the working electrode, a counter-electrode and a reference electrode) was used for the analysis of (25-OH)D in 13 serum samples, comparing the results with those obtained with the standard reference method based on immunochemiluminescence (CLIA) (FIG. 6). The CLIA method, like all conventional immunological assays, requires longer times, larger sample volumes and the presence of specialized personnel, as well as being subject to possible interferences. For this reason, it cannot be used to quickly screen vitamin D, unlike the device covered by this patent application. The (25-OH)D concentration determined by the biosensor according to the present invention showed excellent agreement with the CLIA measurements (FIG. 6A). The graph of the concentration of (25-OH)D obtained by these two methods gave a straight line with a correlation coefficient of 0.9846. The electrochemical method shows good reproducibility between measurements and the standard deviation (SD) obtained was ±0.156 μA. DPV measurements were performed with 1.1 mM $Fe(CN)_6^{3-/4-}$ solution, 100 mM KCl.

The biosensor comprising the electrode according to the present invention shows a better linearity range than almost all of the biosensors reported in the literature [6-11], and allows better monitoring of the patient with hypovitaminosis. The analytical performance of the biosensor described here compared to electrochemical biosensors for vitamin D illustrated in [6-11] are summarized in Table 1.

The results obtained in the work [11] have a greater sensitivity, but an average value on three serum samples has been reported which, compared with the reference one, indicates an error of 14.6%.

Considering the threshold of hypovitaminosis (25-OH)D (32 ng/mL), the analytical characteristics of the electrode subject of the present description make it suitable not only for determining severe hypovitaminosis conditions, but also for accurately following low levels of (25-OH)D, which increase as a result of pharmaceutical treatment.

TABLE 1

Summary of the analytical performance of specific biosensors for determining (25-OH)D.

| Biosensor | Measurement technique | Linearity range | LOD | Slope | Ref. |
|---|---|---|---|---|---|
| CYM@AuMNPs/ Anti-(25-OH)D Ab | DPV | 7.4-70 ng/mL | 6.3 ng/ml | 0.54 mA mL/ng $cm^2$ | |
| AuNPs | DPV | 20-200 ng/ml | 10 ng/ml | 0.16 mA ml/ng $cm^2$ | [6] |
| Anti-(25-OH)D/ $SiO_2$/GO/$(NiOH)_2$/GCE Ab | DPV | 96.2-961 μg/L | 1.25 μg/L | 0.2 mA mL/ng $cm^2$ | [7] |
| GCE/Nafion ®/$Co(sep)^{3+}$/ CYP27B1 | DPV | 5-200 ng/mL | N.R. | N.R. | [8] |
| BSA/Ab anti-(25-OH)D/ $Fe_3O_4$-PANnFs/ITO | DPV | 10-100 ng/mL | 0.12 ng/ml | 0.90 $\mu Ang^{-1}$ mL $cm^{-2}$ | [9] |
| BSA/Ab anti-(25-OH)D/ Asp-$Gd_2O_3$NRs/ITO | DPV | 10-100 ng/mL | 0.10 ng/ml | 0.38 $\mu Ang^{-1}$ mL $cm^{-2}$ | [10] |
| Ab anti-(25-OH)D/ Glut/Au—Pt/APTES/FTO | DPV | 0.1-$10^6$ pg/mL | 0.49 pg/mL | N.R. | [11] |

CONCLUSIONS

Compared to the works present in the literature [6-11], the electrode subject of the present description shows a range of linearity capable of determining lower concentrations of (25-OH)D, with good sensitivity, furthermore it was tested in the analysis on real samples showing excellent agreement with the reference CLIA method.

BIBLIOGRAPHIC REFERENCES

[1]Y. Xu & E. Wang, Electrochemical biosensors based on magnetic micro/nano particles, Electrochim. Acta (2012) 62-73.

[2]L. Liv, Electrochemical immunosensor platform based on gold-clusters, cysteamine and glutaraldehyde modified electrode for diagnosing COVID-19, Microchemical Journal (2021), 168:106445

[3]M. J. Monerris, et al., Integrated electrochemical immunosensor with gold nanoparticles for the determination of progesterone, Sensors and Actuators B: Chemical (2012), 166-167:586-592.

[4]F. Farshchi et al., A novel electroconductive interface based on $Fe_3O_4$ magnetic nanoparticles and cysteamine functionalized AuNPs: preparation and application as signal amplification element to minoring of antigen-antibody immunocomplex and biosensing of prostate cancer, J. Mol. Recognit. (2020), 33:e2825.

[5]S. M. Silva, et al., Gold coated magnetic nanoparticles: from preparation to surface modification for analytical and biomedical applications (2016), 52:7528-7540.

[6]L. Carlucci, et al., Several approaches for vitamin D determination by surface plasmon resonance and electrochemical affinity biosensors, Biosens. Bioelectron. (2013), 40:350-355.

[7]T. Canevari, et al., Synthesis and characterization of a-nickel (II) hydroxide particles on organic-inorganic matrix and its application in a sensitive electrochemical sensor for vitamin D determination, Electrochim. Acta (2014); 147:688-695.

[8]H. F Ozbakir, et al., Detection of 25-Hydroxyvitamin D3 with an Enzyme modified Electrode, J. Biosens. Bioelectron. (2016), 7(1):1-8.

[9]D. Chauhan, et al., Electrochemical immunosensor based on magnetite nanoparticles incorporated electrospun polyacrylonitrile nanofibers for Vitamin-D3 detection, Mater. Sci. Eng. C. (2018), 93:145-156.

[10]D. Chauhan, et al., An efficient electrochemical biosensor for Vitamin-D3 detection based on aspartic acid functionalized gadolinium oxide nanorods, J. Mater. Res. Technol. (2019), 8:5490-5503.

[11]A. Kaur, et al., Gold-platinum bimetallic nanoparticles 50 coated 3-(aminopropyl)triethoxysilane (APTES) based electrochemical immunosensor for vitamin D estimation, J. Electroanal. Chem. (2020), 873:114400.

The invention claimed is:

1. An electrode for electrochemical detection of an analyte in a biological sample, wherein the electrode is a printed, miniaturized, carbon-based electrode and comprises (i) magnetic nanoparticles coated with gold or silver, comprising on the respective surface at least one free amine or carboxyl group, the nanoparticles being adsorbed on the surface of the electrode, and (ii) at least one ligand capable of specifically binding to the analyte, the at least one ligand being conjugated to the nanoparticles.

2. The electrode according to claim 1, wherein the electrode is an electrode made of graphite, graphene, carbon nanotubes, or carbon fibers.

3. The electrode according to claim 1, wherein the electrode is a screen-printed electrode.

4. The electrode according to claim 1, wherein the electrode is a screen-printed graphite electrode.

5. The electrode according to claim 1, wherein the nanoparticles comprise on the respective surface at least one compound of formula (I)

$$SH—R_4—R_5 \quad (I)$$

wherein $R_4$ is selected from linear, saturated $C_{2-11}$ alkyl chains and $R_5$ is selected from $NH_2$ and COOH.

6. The electrode according to claim 1, wherein the at least one ligand is covalently conjugated to the nanoparticles by means of a cross-linking agent.

7. The electrode according to claim 6, wherein the cross-linking agent is selected from a compound comprising at least two terminal aldehyde groups and a carbodiimide derivative.

8. The electrode according to claim 7, wherein the compound comprising at least two terminal aldehyde groups has formula (II)

$$CHO—(CH_2)_n—CHO \quad (II)$$

wherein n is an integer 1 or 2.

9. The electrode according to claim 7, wherein the carbodiimide derivative has formula (III)

(III)

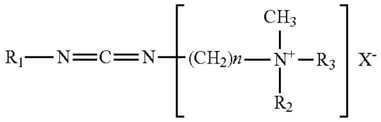

wherein $R_1$ is selected from propyl, tert-butyl, and cyclohexyl;

wherein $R_2$ and $R_3$ are selected from hydrogen and a $C_{1-3}$ alkyl group, or $R_2$ and $R_3$ form together with the nitrogen atom to which they are linked a 4-6 membered heterocyclic group;

wherein X is selected from bromide, iodide, and 4-methyl-toluenesulfonate; and wherein n is an integer 2 or 3.

10. The electrode according to claim 9, wherein the 4-6 membered heterocyclic group comprises an additional heteroatom.

11. The electrode according to claim 1, further comprising on the respective surface at least one neutralizing agent able to avoid formation of non-specific binding of protein compounds contained in the biological sample to be analyzed at the surface of the nanoparticles.

12. The electrode according to claim 1, wherein the analyte to be detected is vitamin (25-OH)D and the at least one ligand is an anti-vitamin (25-OH)D antibody.

13. A biosensor for electrochemical detection of an analyte in a sample comprising a working electrode, a reference electrode, and a counter-electrode, wherein the working electrode is the electrode according to claim 1.

14. A method for producing an electrode for electrochemical detection of an analyte in a sample according to claim 1, comprising the following steps:

(a) adding gold- or silver-coated magnetic nanoparticles to a first water-based solution comprising at least one compound of formula (I)

$$SH—R_4—R_5, \quad (I)$$

wherein $R_4$ is selected from linear, saturated $C_{2-11}$ alkyl chains and $R_5$ is selected from $NH_2$ and COOH, such that the at least one compound of formula (I) is adsorbed on the surface of the nanoparticles, resulting in a second water-based solution comprising nanoparticles comprising at least one free amine or carboxyl group on the respective surface;

(b) depositing the second water-based solution on the surface of a printed, miniaturized, carbon-based electrode in the presence of a magnet positioned below the electrode and allowing the liquid phase of the second solution to evaporate so that the nanoparticles are adsorbed onto the surface of the electrode;

(c) adding a third solution comprising a cross-linking agent onto the electrode surface obtained at the end of step (b); and (d) adding a fourth solution comprising at least one analyte-specific ligand to the surface of the electrode obtained at the end of step (c) and allowing it to react for sufficient time for the at least one ligand to form a covalent bond with the compound of formula (I), resulting in an electrode comprising the at least one ligand attached to the respective surface.

15. The method according to claim 14, comprising a further step (e), wherein a fifth solution comprising a neutralizing agent is added to the surface of the electrode obtained at the end of step (d).

16. A method for electrochemical determination of an analyte in a biological sample comprising the following steps:

(a) contacting the biological sample containing or suspected of containing the analyte with a biosensor comprising a working electrode, a reference electrode, and a counter-electrode, wherein the working electrode is the electrode according to claim 1, under conditions such that the analyte binds to an analyte-specific ligand present on the working electrode and the binding of the analyte to the ligand results in a change in current flow between the working electrode and the counter-electrode; and (b) detecting the change in current generated in step (a) to determine the presence or amount of the analyte in the sample.

* * * * *